(12) United States Patent
Prause et al.

(10) Patent No.: US 10,625,640 B2
(45) Date of Patent: Apr. 21, 2020

(54) LOCKING DEVICE FOR A VEHICLE SEAT

(71) Applicant: BROSE FAHRZEUGTEILE GMBH & CO. KOMMANDITGESELLSCHAFT, COBURG, Coburg (DE)

(72) Inventors: Markus Prause, Coburg (DE); Klaus Schmied, Rödental (DE)

(73) Assignee: BROSE FAHRZEUGTEILE GMBH & CO. KOMMANDITGESELLSCHAFT, Coburg (DE)

( * ) Notice: Subject to any disclaimer, the term of this patent is extended or adjusted under 35 U.S.C. 154(b) by 168 days.

(21) Appl. No.: 15/695,809

(22) Filed: Sep. 5, 2017

(65) Prior Publication Data

US 2018/0065514 A1   Mar. 8, 2018

(30) Foreign Application Priority Data

Sep. 8, 2016   (DE) .......................... 10 2016 217 109

(51) Int. Cl.
*B60N 2/20*   (2006.01)
*B60N 2/22*   (2006.01)
*B60N 2/433*   (2006.01)

(52) U.S. Cl.
CPC ............... *B60N 2/433* (2013.01); *B60N 2/20* (2013.01); *B60N 2205/50* (2013.01)

(58) Field of Classification Search
CPC .......... B60N 2/20; B60N 2/224; B60N 2/235; B60N 2/433; B60N 2205/50
USPC .......... 297/354.12, 366, 374, 378.12; 70/261
See application file for complete search history.

(56) References Cited

U.S. PATENT DOCUMENTS

| 3,322,461 A * | 5/1967 | Goldman ................ B60N 2/20 297/378.12 |
| 5,540,117 A | 7/1996 | Hänsel et al. |
| 2002/0050733 A1 | 5/2002 | Hansel et al. |
| 2009/0015052 A1 | 1/2009 | Weber et al. |
| 2009/0324325 A1 | 12/2009 | Seigel et al. |

(Continued)

FOREIGN PATENT DOCUMENTS

| CN | 204659495 U | 9/2015 |
| CN | 105142974 A | 12/2015 |

(Continued)

OTHER PUBLICATIONS

Chinese Office action dated Aug. 5, 2019 issued in corresponding Chinese Application No. 201710806131.2, 6 pages, with English translation, 4 pages.

*Primary Examiner* — Robert Canfield
(74) *Attorney, Agent, or Firm* — Lewis Roca Rothgerber Christie LLP

(57) ABSTRACT

A locking device for locking two assemblies of a vehicle seat together comprises a blocking element which has a supporting surface, and a locking element which is movable with respect to the blocking element, said locking element having an end face and facing the supporting surface of the blocking element with the end face in a locked position of the locking device, wherein the locking device is unlockable by moving the locking element. Additionally provided is a surface element which is applied to the blocking element to at least partially cover the supporting surface or to the locking element to at least partially cover the end face.

7 Claims, 7 Drawing Sheets

(56) References Cited

U.S. PATENT DOCUMENTS

| | | | | |
|---|---|---|---|---|
| 2010/0133412 A1* | 6/2010 | Imajo | ............... | B60N 2/01583 |
| | | | | 248/503.1 |
| 2010/0283304 A1* | 11/2010 | Thiel | ............... | B60N 2/206 |
| | | | | 297/367 R |
| 2016/0160536 A1* | 6/2016 | Linnenbrink | ......... | B60N 2/919 |
| | | | | 292/92 |
| 2016/0297328 A1 | 10/2016 | Pluta et al. | | |

FOREIGN PATENT DOCUMENTS

| | | |
|---|---|---|
| CN | 105392664 A | 3/2016 |
| CN | 105793100 A | 7/2016 |
| DE | 3825594 A1 | 2/1990 |
| DE | 4439644 A1 | 6/1995 |
| DE | 10018125 A1 | 10/2001 |
| DE | 10220225 A1 | 12/2002 |
| DE | 102004018042 B3 | 9/2005 |
| DE | 202006009003 U1 | 11/2007 |
| DE | 102006050224 B3 | 1/2008 |
| DE | 102006058891 A1 | 6/2008 |
| DE | 102007041477 A1 | 3/2009 |
| DE | 202009013269 U1 | 2/2011 |
| DE | 10 2011 009 226 A1 * | 7/2012 |
| DE | 102013018183 A1 | 1/2015 |
| DE | 102014216951 B3 | 1/2016 |
| EP | 1867808 B1 | 6/2007 |
| EP | 2141312 A1 | 4/2008 |
| EP | 2031164 B1 | 8/2008 |
| WO | WO2009/152892 A1 | 12/2009 |
| WO | WO 2014/171454 A1 | 10/2014 |

\* cited by examiner

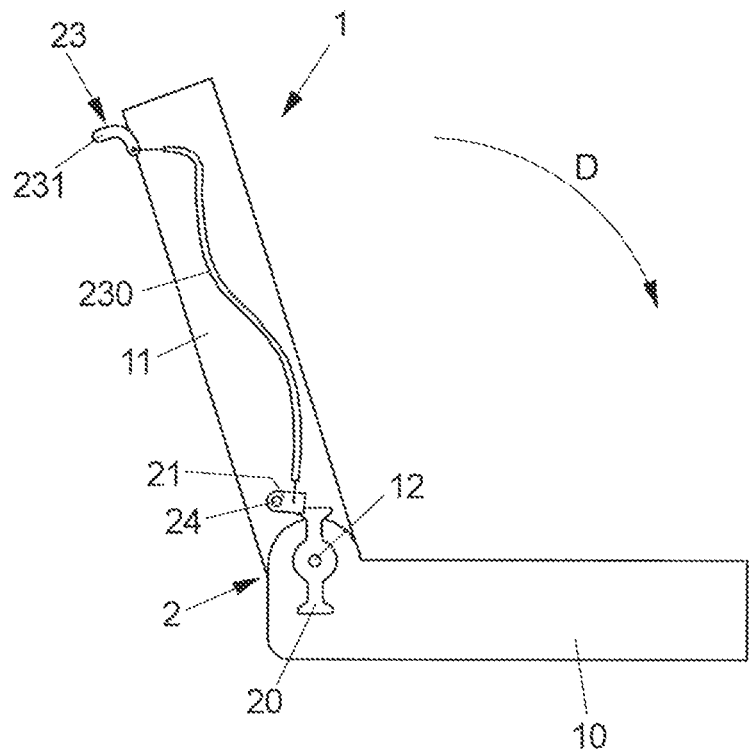
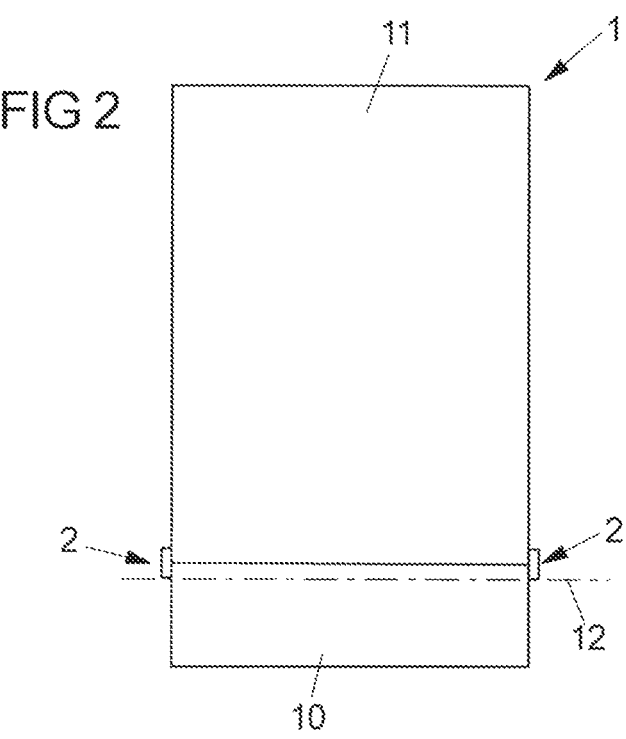

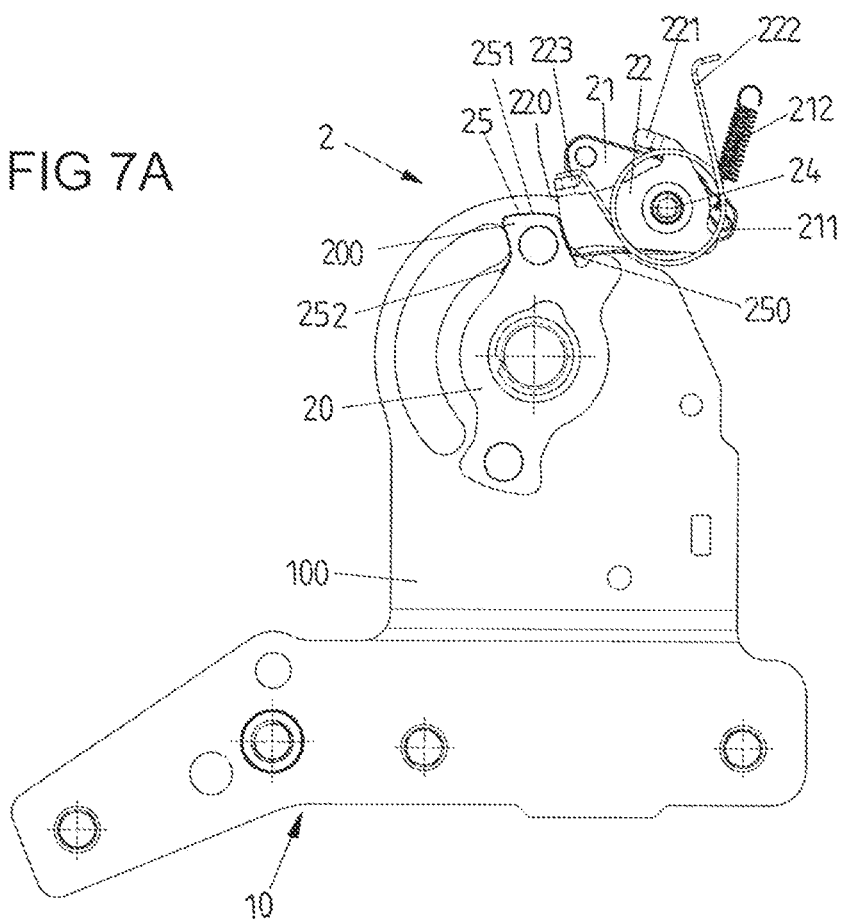
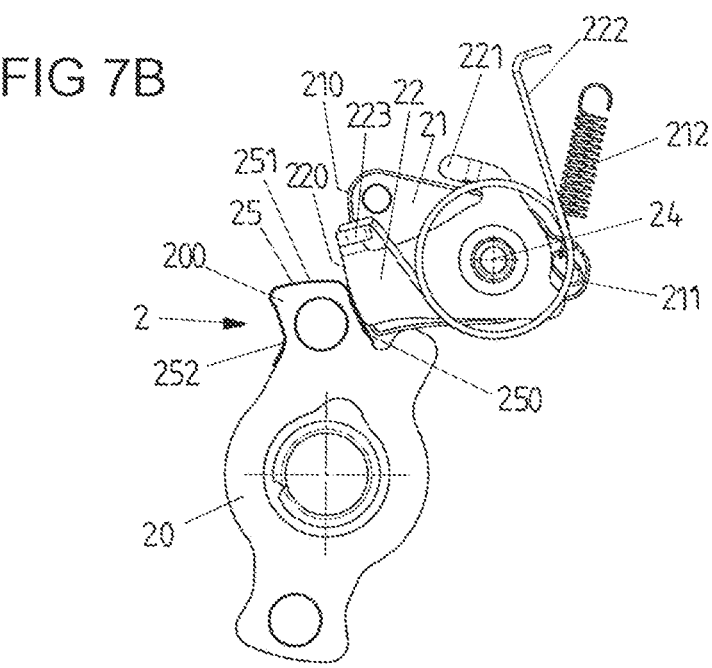

LOCKING DEVICE FOR A VEHICLE SEAT

REFERENCE TO RELATED APPLICATION

This application claims priority to German Patent Application No. 10 2016 217 109.7 filed on Sep. 8, 2016, the entirety of which is incorporated by reference herein.

BACKGROUND

The invention relates to a locking device for a vehicle seat.

Such a locking device comprises a blocking element which has a supporting surface, and a locking element which is movable with respect to the blocking element, said locking element having an end face and facing the supporting surface of the blocking element with the end face in a locked position of the locking device, such that the locking element and the blocking element are not movable past one another and the assemblies of the vehicle seat are thus blocked with respect to one another. By moving the locking element, the locking device can be unlocked, and so the assemblies of the vehicle seat can be moved with respect to one another.

The assemblies of the vehicle seat may be for example a seat part that provides a sitting surface for a vehicle occupant, and a backrest part that is pivotable with respect to the seat part. Via the locking device, the backrest part and the seat part are kept in position with respect to one another, wherein, by unlocking the locking device, the backrest part can for example be folded forward in order to create access to a vehicle space located behind the vehicle seat or to move the vehicle seat into a flat position in order to enlarge a loading space of the vehicle or to create a storage space.

In the locking device, locking takes place in that surfaces of the blocking element and of the locking element oppose one another. In the case of a locking device known from DE 10 2014 216 951 B3, the locking element is realized for example by a friction finger which interacts with a blocking element in the form of a pawl in order to keep the blocking element in position in a locked position of the locking device, such that the blocking element cannot be lifted out of an associated toothing. The friction finger is in frictional contact with the blocking element in the form of the pawl in the locked position, wherein, by moving the friction finger, the blocking element can be adjusted and as a result unlocked.

In the case of a locking device known from DE 44 39 644 C2, a locking element referred to as a securing member is in frictional contact with a blocking element in the form of a pawl, when the locking device is locked. The locking element has a non-self-locking clamping face which secures the pawl in a blocking position, and a catching surface which braces the locking element against the pawl in the event of a crash and thus keeps it in position.

A further locking device is known from EP 2 288 512 A1.

In the case of a locking device of the type described here, a general conflict is that the locking device is intended to lock the assemblies assigned thereto securely and reliably in the locked position even in the event of great loads, and must not open unintentionally for example in the event of a crash, but nevertheless is intended to make unlocking possible easily without great effort. If a locking device is designed for a particularly reliable hold under great loads, in particular in the event of a crash, this can result in a lack of smoothness in operation. If, conversely, the locking device is designed for easy, comfortable actuation, this can impair the hold in the event of a crash. This conflict is amplified even further in that tolerances are unavoidable on locking devices, and moreover a coating layer or grease layer may be present on the mutually facing surfaces of the blocking element, for the one part, and of the locking element, for the other part, said layer influencing the frictional interaction between the elements, and surface changes can occur during operation on account of continuous loading of a vehicle seat. Therefore, a situation in which a lock may open under particular loads or parts seize up and the locking device can no longer be easily actuated cannot be ruled out.

Therefore, there is a need for a locking device for a vehicle seat, which ensures reliable locking, is easy to actuate and is additionally insusceptible to wear.

SUMMARY

The object of the present invention is to provide a locking device for locking two assemblies of a vehicle seat, which allows reliable locking and additionally easy, comfortable actuation in a simple, cost-effective manner.

This object is achieved by a locking device having features as described herein.

Accordingly, the locking device has a surface element which is arranged on to the blocking element to at least partially cover the supporting surface or to the locking element to at least partially cover the end face.

Therefore, the locking device uses an additional component which is applied to the blocking element or to the locking element and is held on the blocking element or the locking element. The surface element in this case covers the supporting surface of the blocking element (when the surface element is applied to the blocking element) or the end face of the locking element (when the surface element is applied to the locking element) and thus the surface which faces the respectively other component for the purpose of locking in the locked position of the locking device.

The surface element extends over the surface of the element assigned to it, i.e. of the blocking element or locking element, and in the process bears extensively (at least regionally) against this surface. The surface element is matched to the contour of the element assigned to it, i.e. of the blocking element or locking element, and follows the contour of the element assigned to it. The surface element extends in this case not only along the supporting surface (when it is arranged on the blocking element) or along the end face (when it is arranged on the locking element), but advantageously also along other surface portions, such that the surface element extensively covers the element assigned to it. However, a situation in which one or more cavities are formed between the surface element and the surface of the element assigned to it, for example in that a depression is formed in the surface of the element, is not ruled out.

In the locked position of the locking device, the supporting surface of the blocking element opposes the end face of the locking element. On account of this opposition, the assemblies assigned to the locking device are locked together because, on account of the supporting of the locking element on the blocking element, movement of the assemblies with respect to one another is blocked. The support takes place in this case extensively via the end face of the locking element against the supporting surface of the blocking element.

For unlocking, the locking element can be moved with respect to the blocking element. This takes place in that the end face of the locking element is moved (frictionally) along the supporting surface of the blocking element, with the result that the opposed position of the end face with respect to the supporting surface is canceled and thus the blocking of the assemblies with respect to one another is released.

Because an additional, separate surface element is used, the surface quality on that surface of the blocking element or locking element that is covered by the surface element is of less importance. In particular, it is not necessary to remove a coating layer or grease layer from the supporting surface of the blocking element or the end face of the locking element. In addition, tolerances can be compensated relatively easily by the surface element. In the locked position, the support between the blocking element and the locking element thus takes place with the surface element in between, and so the supporting properties—in particular the friction between the blocking element and the locking element—are determined essentially by the nature of the surface element.

The surface element may be stretched for example in a band-like manner over the supporting surface or over the end face (depending on which component the surface element is arranged on). In this case, the surface element may be elastically resilient at least regionally and configured for example as a flat spiral spring. In particular, the surface element may be manufactured from a material that is relatively hard compared with the blocking element or the locking element (depending on which component the surface element is arranged on), in particular from a spring steel, and this can have the result in particular that the surface element is insusceptible to wear and for example seizing between the blocking element and the locking element during operation of the locking device can be avoided.

In one configuration, the surface to which the surface element is applied may have a depression over which the surface element extends, forming a cavity between the surface element and the surface. If the surface element is applied to the blocking element and the surface element covers the supporting surface of the blocking element, then, in this case, the supporting surface has a depression which is covered by the surface element such that a cavity in the form of a pocket is formed between the surface element and the supporting surface. By contrast, if the surface element is applied to the locking element and the surface element covers the end face of the locking element, then the end face has a depression which is covered by the locking element, such that a cavity in the form of a pocket is formed between the locking element and the end face. The provision of such a pocket allows the surface element to be able to be elastically deformed in the event of a load on the vehicle seat, for example a load on a backrest part of the vehicle seat, such that wedging of the blocking element with respect to the locking element is avoided. The surface element can thus yield elastically to the load and a resultant change in position of the locking element with respect to the blocking element, and can then also be elastically reset, such that favorable abutment between the locking element and blocking element is achieved even in the event of a change in load.

The surface element is held against the blocking element (when it is applied to the blocking element) or against the locking element (when it is applied to the locking element) for example in a positive locking manner. To this end, the surface element preferably engages in a positive locking manner around the element assigned to it, wherein it is additionally possible for the surface element to be fixed to the element assigned to it by welding or adhesive bonding or by other fastening means.

In order to actuate the locking device, it is possible for example for an actuating device to be provided, which acts on the locking element in order to move the latter out of the locked position. The actuating device can be realized for example by a Bowden cable, a linkage or some other force-transmitting device which acts on a force introduction point of the locking element and thus can introduce an actuating force into the locking element. Via the actuating device, the locking element can be moved with respect to the blocking element in order to cancel the blocking of the assemblies with respect to one another.

The locking element is preferably spring-preloaded in the direction of its locked position, such that the locking device locks automatically as soon as the actuating device is not actuated (anymore). On account of the spring preload, the locking element is transferred automatically into the locked position and thus passes into the blocking position with respect to the blocking element. Unlocking takes place counter to the preloading force for example of a spring element provided for this purpose.

In one configuration, surface elements can be arranged both on the blocking element and on the locking element. In this case, a first surface element is applied to the blocking element to at least partially cover the supporting surface and a second surface element is applied to the locking element to at least partially cover the end face. Blocking thus takes place by support between the first surface element on the blocking element and the second surface element on the locking element.

In one configuration, the locking device has two locking elements which interact with the blocking element. A first locking element has in this case a first end face which exhibits backlash with respect to the blocking element in the locked position in a normal use state. A second locking element is, by contrast, supported on the blocking element via a second end face in the locked position in the normal use state, such that, via this second locking element (which is also referred to as a backlash compensation element), backlash-free support with respect to the blocking element takes place.

The backlash-free support of the second locking element on the blocking element takes place in this case indirectly with the surface element, which can be arranged on the blocking element or the second locking element, in between.

Such a configuration of the locking device can be used for example when, in the case of a vehicle seat, two locking devices on two sides of the vehicle seat are used. A first locking device can in this case have for example only a first locking element, while a second locking device comprises a first and a second locking element. Backlash-free support takes place in this case via the second locking element of the second locking device, while the first locking elements of the first locking device and of the second locking device serve in particular for support in the event of a crash and thus for crash security, but in normal operation exhibit backlash with respect to the blocking element and are thus not in (frictional) contact with the blocking element.

The blocking element may be arranged for example on a first of the assemblies, for example on a seat part of a vehicle seat, while the locking element is arranged on a second of the assemblies, for example on a backrest part. The locking element can be mounted for example in a pivotable manner, is movable (approximately) tangentially to the supporting surface of the blocking element with its end face and blocks any movement of the assemblies with respect to one another in the locked position. After the locking element has been unlocked, the assemblies can be moved with respect to one another.

Such a configuration of the locking device can be used for example in a second or third vehicle seat row, in the case of which setting of the backrest inclination for a comfort position of a vehicle occupant is not intended. In this case, via the locking device, the backrest part can be locked in a (nonsettable) backrest position by interaction between the locking element and the blocking element, wherein the locking device can be unlocked in order to fold the backrest part forward, for example in order to bring the backrest part into a laid-flat position in order to enlarge the loading area of the vehicle or to create a storage space.

In an alternative configuration, the locking device can have a blocking element in the form of a pawl which, together with the locking element, is arranged on an assembly, for example a backrest part, and, in the locked position of the locking device, is for example in tooth engagement with an engaging element on the other assembly, for example the seat part of a vehicle seat. In this case, the blocking element in the form of the pawl is secured in the locked position via the locking element in that the locking element (for example in the form of a friction finger) keeps the blocking element in position and thus in tooth engagement with the engaging element.

A locking device of the type described here is not only usable for locking a backrest part to a seat part but can also be used in very different ways on a vehicle seat (or optionally also on other assemblies of a vehicle). Thus, a locking device of the type described here can be used for example for backrest locking (for what is known as an easy-entry function or a fold-flat function), for floor locking for removable seats, for locking a backrest part for example of a backseat bench or some other back seat to the vehicle body or some other backrest part, for locking load-through facilities or armrests or for some other kinematics locking.

BRIEF DESCRIPTION OF THE DRAWINGS

The concept underlying the invention will be explained in more detail in the following text with reference to the exemplary embodiments illustrated in the figures.

FIG. 1 shows a schematic illustration of a vehicle seat with a locking device.

FIG. 2 shows a schematic front view of a vehicle seat.

FIG. 7A shows a side view of the arrangement in FIG. 6A.

FIG. 7B shows the locking device without the frame part of the seat part.

DETAILED DESCRIPTION

Figure 3A:
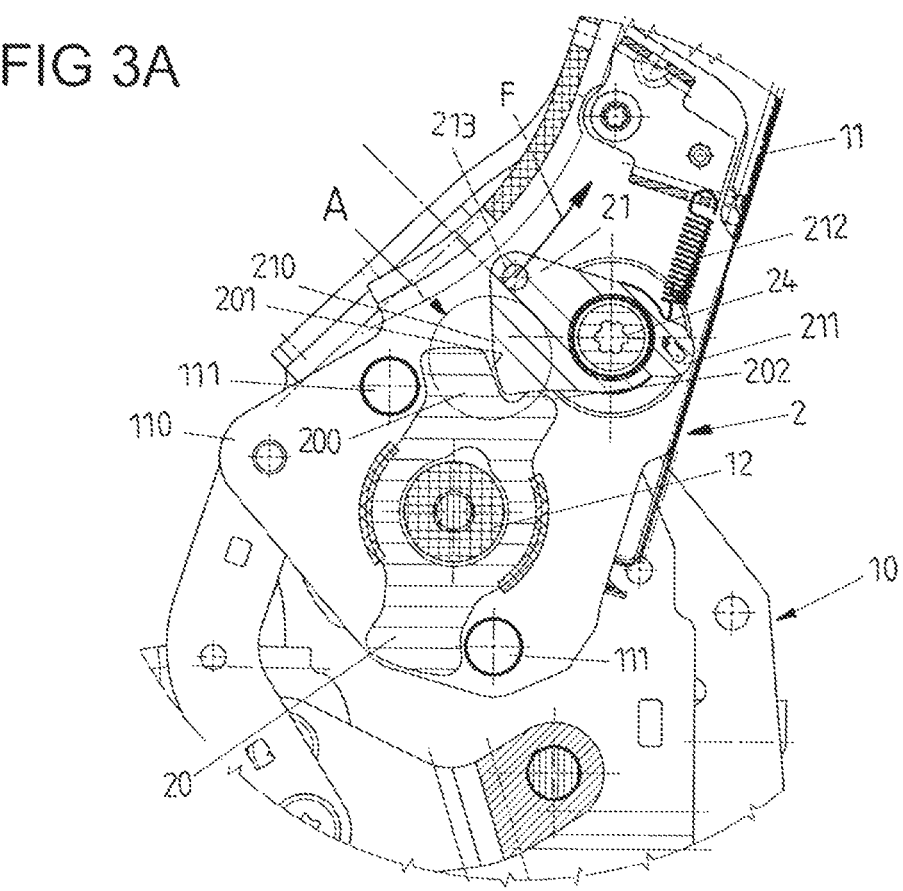
FIG. 3A shows a view of one exemplary embodiment of a locking device.

FIG. 1 shows a schematic view of a vehicle seat 1, which has a seat part 10 and a backrest part 11 that is pivotable in a pivoting direction D with respect to the seat part 10 about a pivot axis 12. The vehicle seat 1 can realize for example a back seat of a second or third vehicle seat row, or a backseat bench.

In the case of the vehicle seat 1, the backrest part 11 is coupled to the seat part 10 via a locking device 2. In a locked position, the locking device 2 locks the backrest part 11 to the seat part 10 such that the backrest part 11 is kept in position with respect to the seat part 10 and cannot pivot (undesirably) about the pivot axis 12. The locking device 2 can be unlocked in order to pivot the backrest part 11 forward in the pivoting direction D and to bring it for example into a flat position so as for example to enlarge the loading space of a vehicle.

The locking device 2 has a blocking element 20 which—in the exemplary embodiment illustrated—is arranged in a fixed position on the seat part 10, said blocking element 20 interacting with a locking element 21 that is pivotable about a bearing element 24 and arranged on the backrest part 11. In the locked position of the locking device 2, the locking element 21 and the blocking element 20 are arranged with respect to one another such that the locking element 21 (on the backrest part 11) cannot be moved past the blocking element 20 (on the seat part 10) and the backrest part 11 is thus blocked with respect to the seat part 10. Via an actuating device 23, which has a transmission device in the form of a Bowden cable 230 and an actuating handle 231, the locking element 21 can be pivoted out of the locked position in order to cancel the blocking engagement between the locking element 21 and the blocking element 20 and thus to be able to pivot the backrest part 11 with respect to the seat part 10.

As is illustrated schematically in FIG. 2, in the case of a vehicle seat 1, locking devices 2 are preferably provided on both sides (on a tunnel side directed toward the center of the vehicle and on a door side directed toward the outside), said locking devices 2 thus locking the backrest part 11 on both sides with respect to the seat part 10. The locking devices 2 can in this case be configured in the same way or differently, as will be explained in more detail below.

Figure 3B:
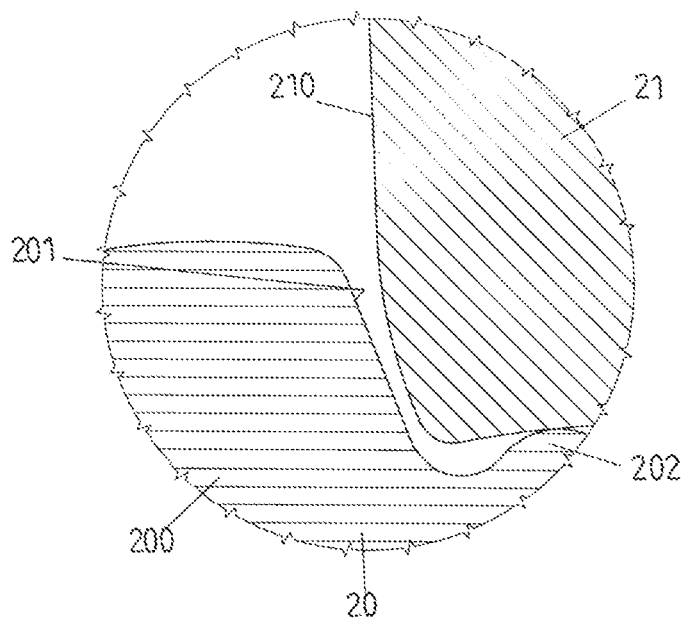
FIG. 3B shows an enlarged view of the detail A in FIG. 3A.

FIGS. 3A, 3B to 7A, 7B show two locking devices 2, of which the locking device 2 illustrated in FIGS. 3A, 3B can be arranged for example on a first side of the vehicle seat 1 and the locking device 2 illustrated in FIGS. 4A, 4B to 7A, 7B can be arranged for example on an opposite, second side and thus in a manner offset axially along the pivot axis 12 with respect to the first locking device 2.

The locking devices 2 in this case differ substantially in that one locking device 2 is made backlash-free (the locking device 2 according to FIGS. 4A, 4B to 7A, 7B), while the other locking device 2 (the locking device 2 according to FIGS. 3A and 3B) exhibits backlash in a normal use state.

The locking devices 2 on the two sides of the vehicle seat 1 are, in the exemplary embodiment illustrated, basically of the same design and differ substantially in that, in the case of the locking device 2 according to FIGS. 4A, 4B to 7A, 7B, an additional, second locking element 22 in the form of a backlash compensation element is provided, which is lacking in the case of the locking device 2 according to FIGS. 3A, 3B.

Figure 6A:
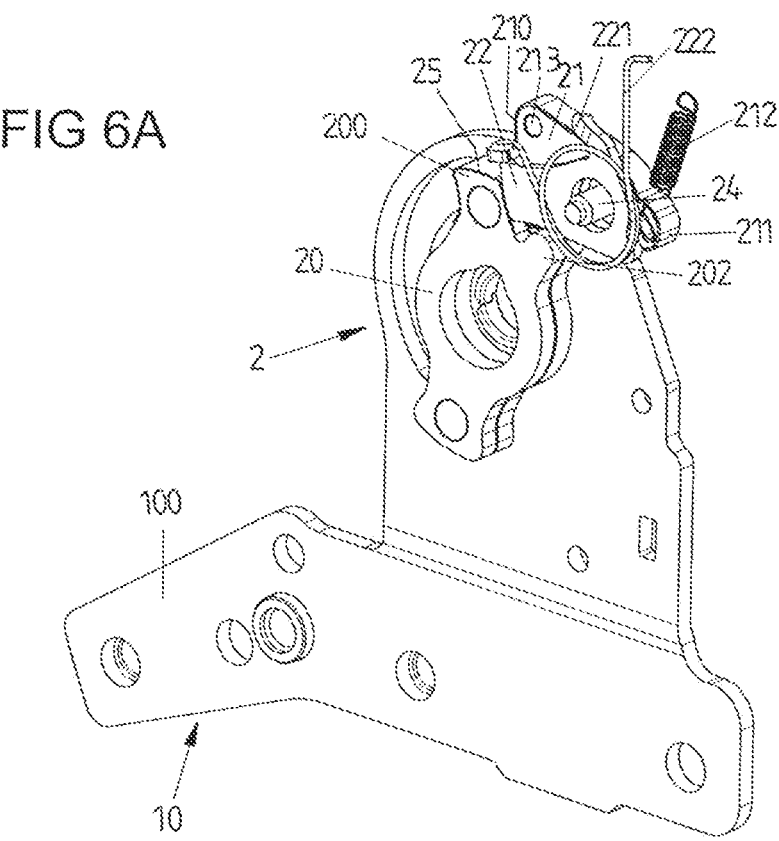
FIG. 6A shows a perspective view of the locking device with a frame part of a seat part of the vehicle seat.
Figure 6B:
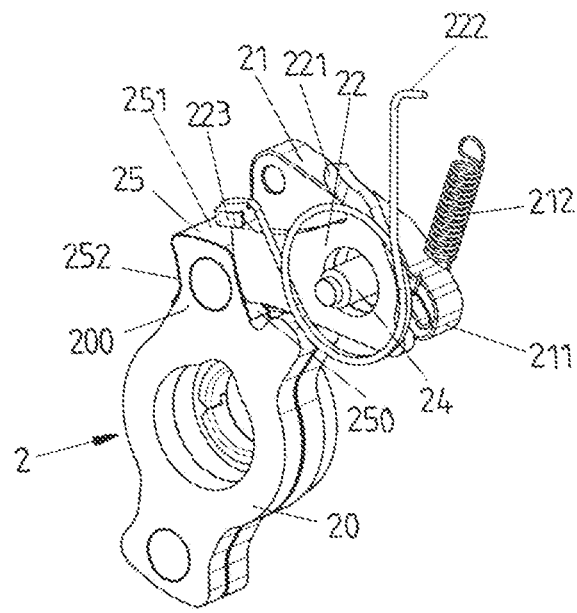
FIG. 6B shows the locking device without the frame part of the seat part.

Each of the locking devices 2 has a blocking element 20 which is firmly connected to the seat part 10, for example welded to a frame part 100 of the seat part 10 (see FIGS. 6A and 7A). The blocking element 20 is arranged coaxially with the pivot axis 12, but not connected thereto.

The blocking element 20 serves for locking to a locking element 21 mounted about a bearing element 24 on a frame part 110 of the backrest part 11. To this end, the blocking element 20 has a supporting surface 201 on a head 200 facing the locking element 21, said supporting surface 201 being in an opposed position with respect to an end face 210 of the locking element 21 in the locked position of the locking device 2 and thus blocking a movement of the backrest part 11 with respect to the seat part 10.

The blocking element 20 also serves as end stop for the backrest part 11 in end positions of the pivoting movement in which the backrest part 11 can come into contact with the blocking element 20 via stop elements 111.

The locking element 21 is mounted on the frame part 110 in a pivotable manner via the bearing element 24, for example in the form of a bearing journal. In the locked position, the end face 210 is located opposite the supporting surface 201 on the head 200 of the blocking element 20, and, in addition, the locking element 21 rests on a rest portion 202 of the blocking element 20.

The locking element 21 is preloaded in the direction of the locked position via a spring element 212 that acts on a portion 211, facing away from the end face 210, of the locking element 21. The Bowden cable 230 acts on a force introduction point 213 in order, when the actuating handle 231 is actuated, to move the locking element 21 out of the locked position (force direction F) and thus to unlock the locking device 2. This takes place counter to the preloading action of the spring element 212.

Figure 4A:
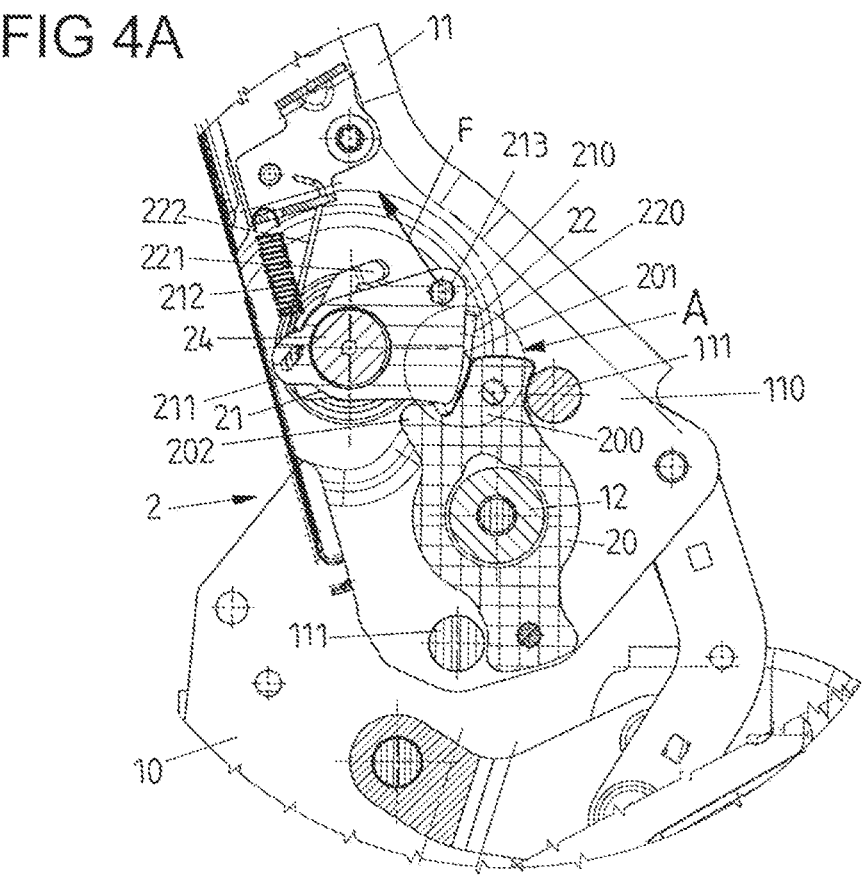
FIG. 4A shows a view of one exemplary embodiment of a locking device.
Figure 4B:
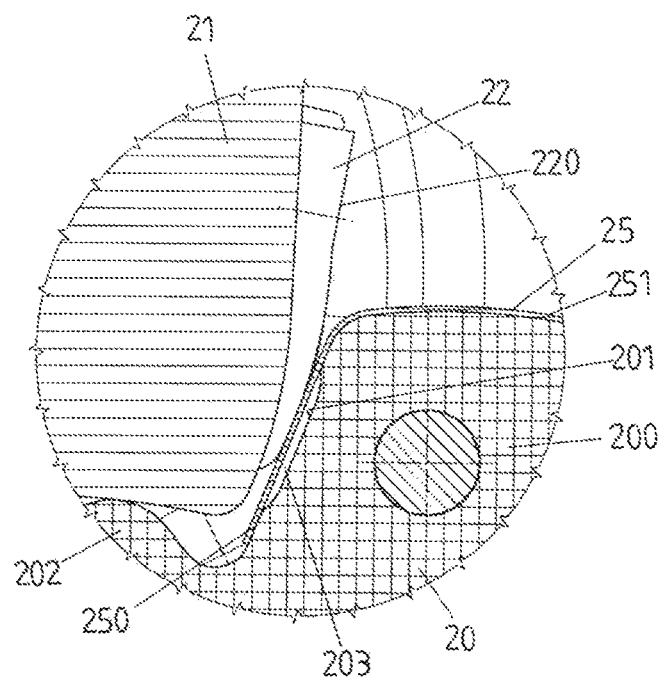
FIG. 4B shows an enlarged view of the detail A in FIG. 4A.

The locking element 21 serves in particular as a support in the case of unusually large loads, in particular in the event of a crash. In a normal use state under normal loads that are brought about by vehicle occupants during operation, the locking element 21, as can be seen in particular from the enlarged view according to FIGS. 3B and 4B, is arranged with backlash between the end face 210 and the supporting surface 201, such that no friction arises between the end face 210 and the supporting surface 201. In the event of a crash, this backlash can be overcome, such that the end face 210 comes into contact with the supporting surface 201, wherein this contact is preferably self-locking and thus the locking element 21 cannot be moved out of its locked position by the crash load.

With regard to the (first) locking element 21, the locking devices 2 on the two sides of the vehicle seat 1 (FIGS. 3A, 3B, for the one part and FIGS. 4A, 4B to 7A, 7B, for the other part) are identical. However, the locking device 2 according to FIGS. 4A, 4B to 7A, 7B additionally has a second locking element 22 (referred to as the backlash compensation element), which is likewise arranged in a pivotable manner on the bearing element 24 and, in the locked position, faces the supporting surface 201 on the blocking element 20 with an end face 220. However, as is apparent in particular from the enlarged view according to FIG. 4B, the end face 22 is, in this case, in frictional contact with the blocking element 20 in the locked position, such that the locking device 2 is held in a backlash-free manner via the second locking element 22.

The second locking element 22 is preloaded in the direction of the locked position via a spring element 222 that acts on an arm 223 of the second locking element 22 (see in this regard in particular FIGS. 6A, 6B and 7A, 7B). The spring element 222 is configured as a leg spring and pushes the second locking element 22 in the direction of the locked position in contact with the blocking element 20.

Upon actuation of the first locking element 21 via the actuating device 23 in order to unlock the locking device 2, the first locking element 21 entrains the second locking element 22 in that the first locking element 21 comes into contact with an arm 221 of the second locking element 22 and thus pivots the second locking element 22 out of its locked position. Once actuation has ended, the two locking elements 21, 22 are then reset into the locked position on account of their spring preload.

It should be noted that the locking devices 2 on the two sides of the vehicle seat 1 are actuated jointly via a (single) actuating device 23 such that unlocking of the locking devices 2 takes place synchronously.

As is apparent from the enlarged view according to FIG. 4B, a surface element 25 in the form of a flat spiral spring produced from spring steel is arranged on the head 200 of the blocking element 20, said spring engaging around the head 200 in a positive locking manner and as a result being held on the blocking element 20.

The surface element 25 in this case engages around the head 200 with legs 250-252. The legs 250-252 in this case follow the contour of the head 200 of the blocking element 20 and cover the head 200 extensively, as is apparent in particular from the perspective views according to FIGS. 6A and 6B.

As a result of the engagement of the legs 250-252, the surface element 25 is held on the head 200 in a positive locking manner, wherein the surface element 25 can be braced with respect to the head 200 on account of its spring-elastic configuration.

The leg 250 comes to lie on the supporting surface 201 of the head 200 of the blocking element 20 and covers this supporting surface 201 extensively over the entire width of the blocking element 20, such that the leg 250 forms an intermediate layer between the supporting surface 201 of the head 200 and the first locking element 21 and also the second locking element 22.

The leg 250 covers the supporting surface 201 and in the process spans a depression 203 in the supporting surface 201, such that a pocket is formed between the leg 250 and the supporting surface 201 (see FIG. 4B). The surface element 25, which is in contact with the end face 220 of the second locking element 22 in the locked position, can thus yield elastically at least to a certain extent and move into the depression 203, thereby allowing elastic compensation of the position of the second locking element 22 with respect to the blocking element 20. In this way, wedging and jamming of the locking device 2 under the load of the backrest part 11, for example in the case of tension or pressure on the backrest part 11, can be avoided.

Figure 5:
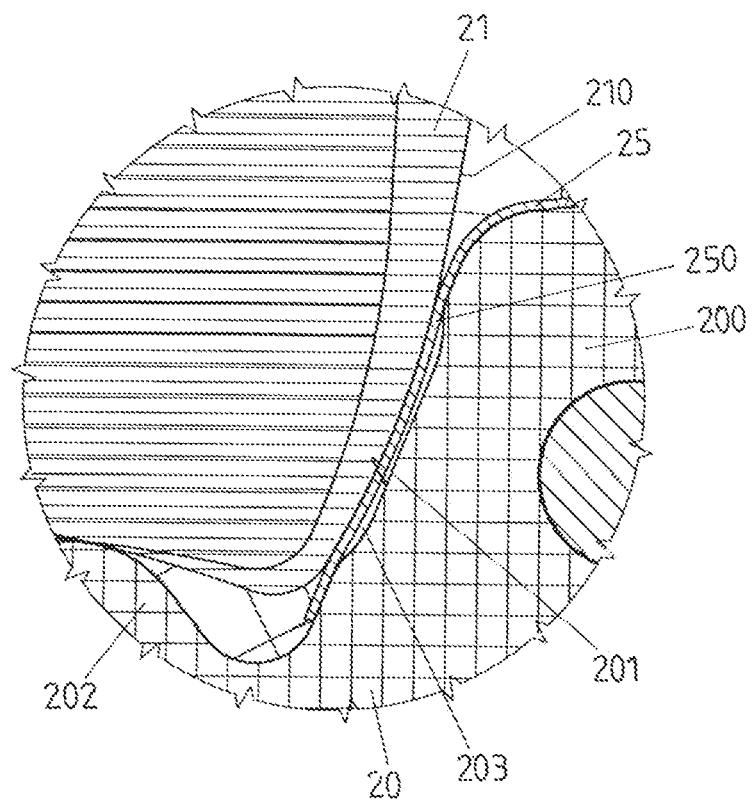
FIG. 5 shows the view in FIG. 4B following deformation in the event of a crash.

In the event of a crash, the second locking element 22 can, under certain circumstances, deform on account of the great loads that act in the event of a crash. In this case, as illustrated in FIG. 5, contact between the first locking element 21 and the blocking element 20 in the region of the supporting surface 201 can occur, wherein this takes place with the surface element 25 being pushed into the depression 203 until the first locking element 21 is supported firmly on the blocking element 20 (with the surface element 25 in between). Via the first locking element 21, crash security is thus provided with reliable support in the event of a crash.

In the event of a crash, support also takes place in this case via the locking element 21 of the other locking device 2, illustrated in FIGS. 3A, 3B, (which does not have a second locking element 22) on the other side of the vehicle seat 1.

In a modification of the exemplary embodiment according to FIGS. 3A, 3B, it is also possible, in the case of the locking device 2 on the other side of the vehicle seat 1, for a surface element 25 to be provided on the head 200 of the blocking element 20, such that support in the event of a crash takes place analogously to the illustration in FIG. 5.

Figure 8A:
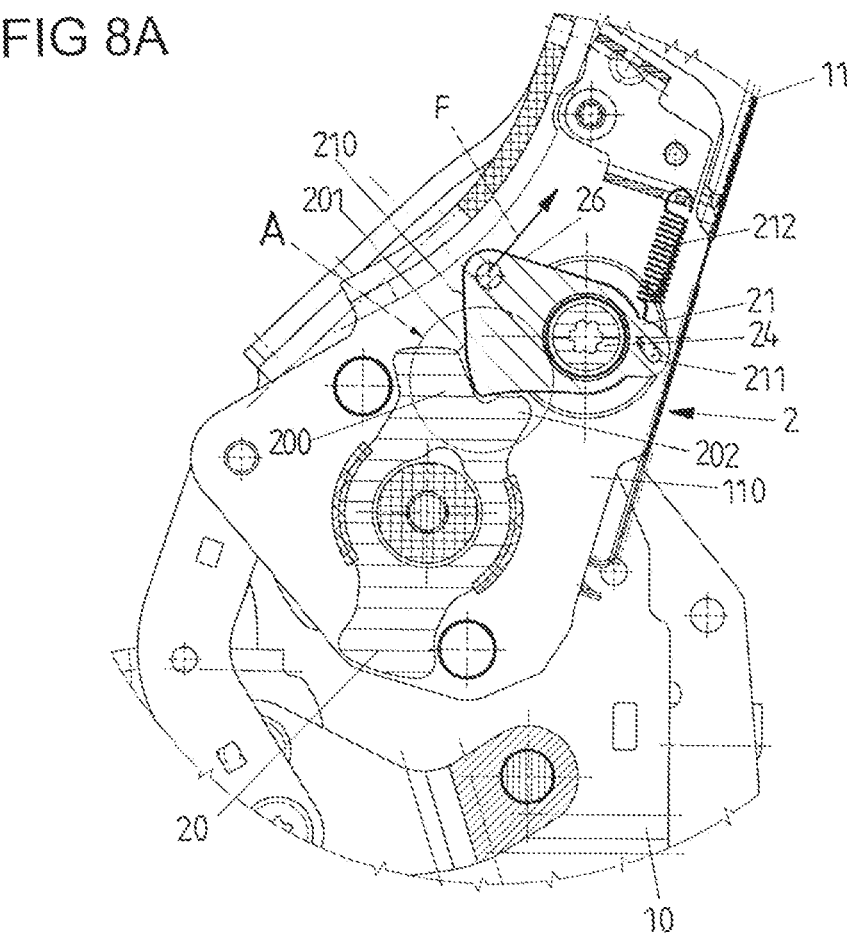
FIG. 8A shows a view of another exemplary embodiment of a locking device.
Figure 8B:
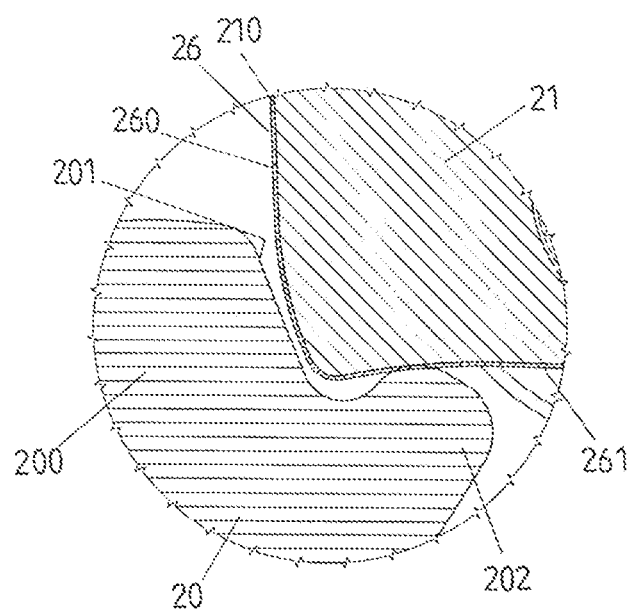
FIG. 8B shows an enlarged view of the detail A in FIG. 8A.

In another exemplary embodiment, illustrated in FIGS. 8A, 8B, a surface element 26 in the form of a flat spiral spring is not arranged on the blocking element 20 but on the first locking element 21. The surface element 26 engages in a positive locking manner around the first locking element 21 with legs 260, 261 and is held on the locking element 21 via the latter. This can be provided for the locking devices 2 on both sides of the vehicle seat 1 or only on one side.

In an alternative configuration, it is also conceivable and possible to arrange a surface element on the second locking element 22.

In a further alternative, it is conceivable and possible to arrange surface elements on the blocking element 20, the first locking element 21 and optionally also the second locking element 22.

The additionally provided surface element can in this case be held in each case in a positive locking manner on the associated element, that is to say the blocking element 20, the first locking element 21 or the second locking element 22. However, it is also conceivable and possible to fix the surface element additionally on the associated element, for example by welding or adhesive bonding or in some other way.

The concept underlying the invention is not limited to the exemplary embodiments outlined above but can be realized in principle also in very different ways in very different embodiments.

As a result of the provision of the additional surface element applied to the associated element, such a surface, which is intended to come into contact with another element for blocking purposes, is at least partially covered. In this way, the friction properties for blocking the locking device are determined substantially by the surface element, wherein the surface element can be produced preferably from a specially hardened material, for example a spring steel, which is insusceptible to wear.

Because the blocking element thus comes into contact with an associated locking element with one or more surface elements in between, seizing can be avoided. The locking device can thus have a favorable blocking behavior in particular even under great loads for example in the event of a crash and also easy, comfortable operability.

As a result of the provision of elasticity in particular through the introduction of a pocket behind the surface element, it is additionally possible for tolerances to be favorably compensated in that a change in position between the blocking elements on account of loads can be compensated.

A locking device of the type described here is not limited to the locking of a backrest part to a seat part. A locking device can be used on very different assemblies of a vehicle seat or elsewhere in the vehicle, for example for locking a seat part to a floor assembly in the case of removable vehicle seats or for locking a backrest part to the vehicle body.

LIST OF REFERENCE SIGNS

1 Vehicle seat
10 Seat part
100 Frame part
11 Backrest part
110 Frame element
111 Stop element
12 Pivot axis
2 Locking device
20 Blocking element
200 Blocking portion (head)
201 Supporting surface
202 Rest portion
203 Depression
21 Locking element
210 End face
211 Portion
212 Preloading element
213 Force introduction point
22 Locking element (compensation element)
220 End face
221 Arm
222 Preloading element
223 Arm
23 Actuating device
230 Transmission device (Bowden cable)
231 Lever
24 Bearing element
25 Surface element (spring element)
250, 251, 252 Legs
26 Surface element (spring element)
260, 261 Legs
D Pivoting direction
F Force

The invention claimed is:

1. A locking device for locking two assemblies of a vehicle seat with respect to each other, the locking device comprising:
   a blocking element which has a supporting surface;
   a locking element which is pivotable with respect to the blocking element, said locking element having an end face, the end face facing the supporting surface of the blocking element in a locked position of the locking device, wherein the locking device is unlockable by moving the locking element with respect to the blocking element;
   an actuating device operatively coupled to the locking element at a force introduction point, the actuating device being actuatable for moving the locking element out of the locked position; and
   a surface element which is arranged, as a separate element, on the blocking element to at least partially cover the supporting surface or on the locking element to at least partially cover the end face;
   wherein the surface element is formed by an elastically resilient band made from a spring steel.

2. The locking device according to claim 1, wherein a surface on which the surface element is arranged has a depression over which the surface element extends, forming a cavity between the surface element and the surface.

3. The locking device according to claim 1, wherein the surface element engages around the blocking element or around the locking element such that the surface element is held against the blocking element or the locking element in a positive locking manner.

4. The locking device according to claim 1, wherein the locking element is spring-preloaded in a direction of the locked position.

5. The locking device according to claim 1, wherein the locking device has a first locking element with a first end face, which comprises a play with respect to the blocking element in the locked position in a normal use state, and a second locking element with a second end face, which is supported with respect to the blocking element in the locked position in the normal use state.

6. The locking device according to claim 1, wherein the blocking element is arranged on a first of the assemblies and the locking element is arranged on a second of the assemblies.

7. The locking device according to claim 1, wherein the first assembly is a seat part of the vehicle seat on which the blocking element is arranged, and the second assembly is a backrest part that is pivotable about a pivot axis with respect to the seat part, wherein the locking device is configured to lock the backrest part to the seat part in the locked position.

* * * * *